(12) United States Patent
Kobori et al.

(10) Patent No.: US 11,401,446 B2
(45) Date of Patent: Aug. 2, 2022

(54) ELECTROCONDUCTIVE ADHESIVE COMPOSITION

(71) Applicant: TANAKA KIKINZOKU KOGYO K.K., Tokyo (JP)

(72) Inventors: Koyo Kobori, The Cavendish (SG); Yoshito Imai, The Cavendish (SG); Shintaroh Abe, The Cavendish (SG); Takeshi Kondo, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 155 days.

(21) Appl. No.: 16/630,038

(22) PCT Filed: Jul. 10, 2018

(86) PCT No.: PCT/JP2018/026104
§ 371 (c)(1),
(2) Date: Jan. 10, 2020

(87) PCT Pub. No.: WO2019/013231
PCT Pub. Date: Jan. 17, 2019

(65) Prior Publication Data
US 2021/0317342 A1 Oct. 14, 2021

(30) Foreign Application Priority Data
Jul. 11, 2017 (JP) .............................. JP2017-135202

(51) Int. Cl.
| | | |
|---|---|---|
| *C09J 11/04* | (2006.01) | |
| *C09J 9/02* | (2006.01) | |
| *C09J 5/06* | (2006.01) | |
| *C08K 3/08* | (2006.01) | |

(52) U.S. Cl.
CPC . *C09J 9/02* (2013.01); *C09J 5/06* (2013.01); *C09J 11/04* (2013.01); *C08K 2003/0806* (2013.01); *C08K 2201/001* (2013.01); *C08K 2201/005* (2013.01); *C08K 2201/011* (2013.01)

(58) Field of Classification Search
CPC . C09J 163/00; C09J 11/04; C09J 9/02; C08K 2003/0806; C08L 101/12
See application file for complete search history.

(56) References Cited

U.S. PATENT DOCUMENTS

| | | | | |
|---|---|---|---|---|
| 2011/0140162 A1* | 6/2011 | Okada | ................. | C09J 163/00 257/99 |
| 2016/0121432 A1 | 5/2016 | Watanabe et al. | | |
| 2017/0243849 A1* | 8/2017 | Sasaki | ................. | C08L 101/12 |

FOREIGN PATENT DOCUMENTS

| | | | | | |
|---|---|---|---|---|---|
| CN | 106795375 A | | 5/2017 | | |
| EP | 3 211 041 A1 | | 8/2017 | | |
| JP | 2007051272 A | * | 3/2007 | ............. | C09J 11/04 |
| JP | 2013231161 A | * | 11/2013 | ............. | C09J 11/04 |
| JP | 2015-162392 A | | 9/2015 | | |
| JP | 5872545 B2 | | 3/2016 | | |
| KR | 10-2017-0075748 A | | 7/2017 | | |
| TW | 201247859 A1 | | 12/2012 | | |
| WO | 2012133767 A1 | | 10/2012 | | |
| WO | 2014/185073 A1 | | 11/2014 | | |
| WO | 2016/063931 A1 | | 4/2016 | | |

OTHER PUBLICATIONS

International Search Report dated Sep. 25, 2018 issued by the International Searching Authority in counterpart International Application No. PCT/JP2018/026104 (PCT/ISA/210).
Written Opinion dated Sep. 25, 2018 issued by the International Searching Authority in counterpart International Application No. PCT/JP2018/026104 (PCT/ISA/237).
Communication dated May 31, 2019 issued by the International Searching Authority in counterpart International Application No. PCT/JP2018/026104 (PCT/IPEA/409).
Communication dated Jul. 27, 2020 issued by the German Intellectual Property Office in counterpart German Application No. 11 2018 003 560.3.
Notification of Reasons for Refusal dated Mar. 12, 2021, issued by the Korean Patent and Trademark Office in counterpart Korean Patent Application No. 10-2020-7000770.
The First Office Action dated Sep. 16, 2020, from the State Intellectual Property Office of People's Republic of China in counterpart Application No. 201880045809.2.

\* cited by examiner

*Primary Examiner* — Khanh T Nguyen
(74) *Attorney, Agent, or Firm* — Sughrue Mion, PLLC

(57) ABSTRACT

An object of the present invention is to provide an electroconductive adhesive composition which has excellent thermal conductivity and which, even when repeatedly undergoing fluctuations in temperature, is less apt to cause adherend separation. The present invention relates to an electroconductive adhesive composition which contains: an electroconductive filler (A) containing metal particles (a1) having an average particle diameter of 0.5-10 μm and silver particles (a2) having an average particle diameter of 10-200 nm; and particles (B) of a thermoplastic resin which is solid at 25° C.

8 Claims, No Drawings

ELECTROCONDUCTIVE ADHESIVE COMPOSITION

CROSS REFERENCE TO RELATED APPLICATIONS

This application is a National Stage of International Application No. PCT/JP2018/026104 filed Jul. 10, 2018, claiming priority based on Japanese Patent Application No. 2017-135202 filed Jul. 11, 2017, the entire disclosures of which are incorporated by reference herein.

TECHNICAL FIELD

The present invention relates to an electroconductive adhesive composition.

BACKGROUND ART

In producing electronic components, electroconductive adhesive compositions are used as die bonding materials for bonding semiconductor elements to supporting members such as lead frames. The electroconductive adhesive compositions generally include metal powders, e.g., silver powders and copper powders, because of the high electrical conductivity thereof. A large number of reports have been made on adhesives containing metal powders and on pasty adhesives which require sintering for bonding.

Nowadays, there is a rapidly growing demand for electronic components having reduced sizes and advanced functions, e.g., power devices and light-emitting diodes (LEDs), and the amount of heat generated by semiconductor elements tends to increase as the size reduction in electronic components proceeds. However, through long-term exposure to high-temperature environments, semiconductor elements become unable to perform the intrinsic functions and come to have a shortened life. Because of this, the die bonding materials are required to have a high thermal conductivity so as to efficiently diffuse the heat generated by the semiconductor elements to the supporting members, and the required level is increasing.

Techniques have been reported in which metal particles having a size on the order of nanometer are used, besides conventionally used micrometer-order metal particles, as an electroconductive filler for improving the thermal conductivity in an electroconductive adhesive in order to meet that requirement.

For example, in Patent Document 1 has been reported an electroconductive paste characterized by including a flaky silver powder having an average particle diameter of 2-20 μm, a tap density (TD) of 2.0-7.0 g/cm$^3$, and a carbon compound content of 0.5% by mass or less, silver nanoparticles having an average particle diameter of 10-500 nm, and a thermosetting resin.

In Patent Document 2 has been reported a thermally conductive composition which includes a silver powder, fine silver particles, a silver salt of a fatty acid, and an amine, the silver powder having an average particle diameter of 0.3-100 μm and the fine silver particles having an average primary-particle diameter of 50-150 nm, a crystallite diameter of 20-50 nm, and a ratio of the average particle diameter to the crystallite diameter of 1-7.5, and which further includes a silver resinate.

CITATION LIST

Patent Literature

Patent Document 1: JP-A-2015-162392
Patent Document 2: Japanese Patent No. 5872545

SUMMARY OF THE INVENTION

Technical Problem

Electroconductive adhesive compositions containing both micrometer-order metal particles and nanometer-order metal particles, such as those described above, give cured objects which have a dense sinter structure but have voids therein. In cases when such a cured object repeatedly undergoes fluctuations in temperature due to heat generation by a semiconductor element such as those shown above, the metal, which has a necking structure, may move in such directions that the area of those portions of the metal, which are in contact with the voids decreases to lower the surface energy, resulting in the growth of the metal. Although the cured objects obtained from electroconductive adhesive compositions containing both micrometer-order metal particles and nanometer-order metal particles generally have low stress relaxation performance due to the dense crystalline structure thereof, the occurrence of the growth of the metal described above results in a further decrease in stress relaxation performance because of, for example, the formation of large voids in the vicinity of the bonding interface due to the movement of the metal. In such a case, there is a problem in that the adherends are prone to be separated off by the stress due to a difference in the coefficient of linear thermal expansion between the adherends.

Meanwhile, a technique for improving the electrical conductivity and thermal conductivity of an electroconductive adhesive composition is employed in which the content of the metallic components therein is increased to heighten the packing density. Patent Documents 1 and 2 disclose, in the Examples, electroconductive adhesive compositions each containing micrometer-order metal particles and nanometer order metal particles in a total amount of 80% or larger based on the whole electroconductive adhesive composition. However, such electroconductive adhesive compositions having a high metal content give cured objects which generally have low stress relaxation performance and are especially prone to cause the separation.

An object of the present invention, which has been achieved in view of that problem, is to provide an electroconductive adhesive composition which has excellent thermal conductivity and which, even when repeatedly undergoing fluctuations in temperature, is less apt to cause adherend separation.

Solution to the Problem

The present inventors diligently made investigations and, as a result, have discovered that an electroconductive adhesive composition which includes an electroconductive filler including both metal particles having an average particle diameter of 0.5-10 μm and silver particles having an average particle diameter of 10-200 nm and further includes particles of a thermoplastic resin that is solid at 25° C. is capable of forming adhesive layer which has excellent thermal conductivity and which, even when repeatedly undergoing fluctuations in temperature, is less apt to cause adherend separation.

Specifically, the present invention provides an electroconductive adhesive composition which includes: an electroconductive filler (A) including metal particles (a1) having an average particle diameter of 0.5-10 μm and silver particles (a2) having an average particle diameter of 10-200 nm; and particles (B) of a thermoplastic resin which is solid at 25° C.

In the electroconductive adhesive composition according to one embodiment of the invention, the metal particles (a1) includes silver as a main component.

In the electroconductive adhesive composition according to another embodiment of the invention, the metal particles (a1) and the silver particles (a2) are contained in amounts in the ranges of 35-85% by mass and 5-50% by mass, respectively, based on the whole electroconductive adhesive composition.

In the electroconductive adhesive composition according to another embodiment of the invention, the metal particles (a1) and the silver particles (a2) are contained in a proportion in the range of 95:5 to 40:60 in terms of mass ratio.

In the electroconductive adhesive composition according to another embodiment of the invention, the thermoplastic resin has a melting point in the range of 50-300° C.

In the electroconductive adhesive composition according to another embodiment of the invention, the thermoplastic-resin particles (B) have an average particle diameter of 1-30 μm.

In the electroconductive adhesive composition according to another embodiment of the invention, the thermoplastic-resin particles (B) are contained in an amount in the range of 0.1-10% by mass based on the whole electroconductive adhesive composition.

The present invention further provides a cured electroconductive adhesive obtained by curing any one of these electroconductive adhesive compositions.

The present invention furthermore provides an electronic appliance in which any one of these electroconductive adhesive compositions has been used for bonding a component.

Advantageous Effects of Invention

The electroconductive adhesive composition of the present invention is characterized by containing an electroconductive filler (A) including metal particles (a1) having an average particle diameter of 0.5-10 μm and silver particles (a2) having an average particle diameter of 10-200 nm, and this feature improves the thermal conductivity. Furthermore, the possibility that adherend separation might occur due to the inclusion of the nanometer-order silver particles when the electroconductive adhesive repeatedly undergoes temperature fluctuations is inhibited from becoming higher by the inclusion of the particles (B) of a thermoplastic resin which is solid at 25° C. Because of these, the electroconductive adhesive of the present invention has excellent thermal conductivity and is less apt to cause adherend separation even when repeatedly undergoing temperature fluctuations.

DESCRIPTION OF EMBODIMENTS

Embodiments of the present invention are described below, but the invention is not construed as being limited to the following embodiments and can be modified at will unless the modifications depart from the gist of the invention. In this description, each "-" used for indicating a numerical range means that the numerical values that precede and succeed the symbol are included in the range as the lower and upper limits.

In this description, the average particle diameters of the metal particles (a1) and particles (B) of a thermoplastic resin which is solid at 25° C. are each the 50% average particle diameter (D50) determined from a particle diameter distribution obtained using a laser diffraction/scattering type particle size analyzer. For example, the average particle diameter can be determined using laser diffraction/scattering type particle size analyzer MT-3000, manufactured by Nikkiso Co., Ltd. The average particle diameter of the silver particles (a2) is the 50% average particle diameter (D50) determined from a particle diameter distribution obtained by a dynamic light scattering method. For example, the average particle diameter can be determined using particle size distribution analyzer Nanotrac, manufactured by Nikkiso Co., Ltd.

[Electroconductive Filler (A)]

The electroconductive filler (A) in the present invention includes metal particles (a1), having an average particle diameter of 0.5-10 μm and silver particles (a2) having an average particle diameter of 10-200 nm.

<Metal Particles (a1)>

The average particle diameter of the metal particles (a1) in the present invention is 0.5-10 μm, preferably 0.6-8 μm, more preferably 0.7-7 μm, still more preferably 0.8-6 μm. In case where the average particle diameter of the metal particles (a1) is less than 0.5 μm, the electroconductive adhesive composition is not inhibited from curing contraction, resulting in a decrease in adhesion to the adherends. In case where the average particle diameter of the metal particles (a1) exceeds 10 μm, the sintering of the metal particles (a1) is less apt to proceed, resulting in a decrease in adhesion to the adherends.

The metal particles (a1) in the present invention are not particularly limited so long as the particles are an ingredient which contributes to the electrical conductivity of the electroconductive adhesive. Usable metals are powders of any metal handled as a common conductor. Examples thereof include elemental metals such as silver, copper, gold, nickel, aluminum, chromium, platinum, palladium, tungsten, and molybdenum, alloys of two or more of these metals, materials coated with these metals, oxides of these metals, and satisfactorily electroconductive compounds of these metals. More preferred of these are metals including silver as a main component, because such metals are less apt to oxidize and have high thermal conductivity. The term "main component" means the component which is highest in content among the components of the metal particles.

The tap density of the metal particles (a1) is not particularly limited. However, from the standpoint of ensuring the strength of adhesion to adherends, the tap density thereof is preferably 4 g/cm³ or higher, more preferably 5 g/cm³ or higher, still more preferably 5.5 g/cm³ or higher. From the standpoint of preventing the metal particles (a1) from sedimenting and becoming unstable during long-term storage of the electroconductive adhesive composition, the tap density thereof is preferably 8 g/cm³ or less, more preferably 7.5 g/cm³ or less, still more preferably 7 g/cm³ or less. The tap density is determined, for example, by a measurement and a calculation in accordance with "Metal Powders—Method for Measuring Tap Density" as provided for in JIS Z2512: 2012.

The specific surface area of the metal particles (a1) is not particularly limited, and is preferably 0.1-3 m²/g, more preferably 0.2-2 m²/g, still more preferably 0.3-1 m²/g. In cases when the specific surface area of the metal particles is 0.1 m²/g or larger, surfaces of the metal particles (a1) which come into contact with adherends can have a sufficient area. Meanwhile, in cases when the specific surface area of the metal particles (a1) is 3 m²/g or less, the amount of a solvent to be added to the electroconductive composition can be reduced.

The shape of the metal particles (a1) is not particularly limited, and examples thereof include spherical, flaky, platy, scaly, and dendritic shapes. In general, flaky or spherical particles are selected. As the metal particles (a1), use can be made of not only particles made of a single metal but also coated metal particles configured of two or more metals or a mixture of the former particles with the latter particles.

The metal particles (a1) may be ones, the surface of which has been coated with a coating agent. Examples of the coating agent include coating agents including carboxylic acids. By using a coating agent including a carboxylic acid, the heat dissipation properties of the electroconductive adhesive composition can be still further improved.

The carboxylic acid included in the coating agent is not particularly limited, and examples thereof include monocarboxylic acids, polycarboxylic acids, and oxycarboxylic acids.

A mixture of two or more carboxylic acids may be contained in the coating agent. Preferred are higher fatty acids which are saturated or unsaturated fatty acids having 12-24 carbon atoms.

Examples of methods for coating the surface of metal particles (a1) with a coating agent include known methods such as a method in which the particles and the coating agent are stirred and kneaded together in a mixer and a method in which a solution of a carboxylic acid is infiltrated into the metal particles (a1) and the solvent is volatilized.

<Silver Particles (a2)>

The average particle diameter of the silver particles (a2) in the present invention is 10-200 nm, preferably 20-180 nm, more preferably 30-170 nm, still more preferably 40-160 nm. In case where the average particle diameter of the silver particles (a2) is less than 10 nm, it is difficult to remove any organic matter covering the silver particles and sintering is less apt to proceed. In case where the average particle diameter of the silver particles (a2) exceeds 200 nm, the silver particles have a reduced specific surface area and are less apt to sinter.

The tap density of the silver particles (a2) is not particularly limited. However, from the standpoint of increasing the number of contact points of the silver particles to facilitate the sintering, the tap density thereof is preferably 4 g/cm³ or higher, more preferably 5 g/cm³ or higher, still more preferably 5.5 g/cm³ or higher. From the standpoint of preventing the silver particles (a2) from sedimenting and becoming unstable during long-term storage of the electroconductive adhesive composition, the tap density thereof is preferably 8 g/cm³ or less, more preferably 7.5 g/cm³ or less, still more preferably 7 g/cm³ or less. The tap density is determined, for example, by a measurement and a calculation in accordance with "Metal Powders—Method for Measuring Tap Density" as provided for in JIS Z2512:2012.

The shape of the silver particles (a2) is not particularly limited, and examples thereof include spherical, cubic, and rod shapes. As the silver particles (a2), use can be made of not only particles of pure silver but also metal particles coated with silver or a mixture of the former particles with the latter particles.

The silver particles (a2) may be ones, the surface of which has been coated with a coating agent. The coating agent to be used and coating methods are not particularly limited. However, use can be made of any of those shown above as examples in regard to the coating of the metal particles (a1) described above.

In the electroconductive adhesive composition of the present invention, the content of the metal particles (a1) is preferably 35-85% by mass, more preferably 40-75% by mass, still more preferably 45-65% by mass, based on the whole electroconductive adhesive composition from the standpoints of improving the electrical conductivity and the thermal conductivity and ensuring applicability. The content of the silver particles (a2) is preferably 5-50% by mass, more preferably 10-40% by mass, still more preferably 15-35% by mass, based on the whole electroconductive adhesive composition.

In the electroconductive adhesive composition of the present invention, the proportion of the metal particles (a1) to the silver particles (a2) is preferably in the range of 95:5 to 40:60, more preferably in the range of 90:10 to 50:50, still more preferably in the range of 85:15 to 60:40, in terms of mass ratio from the standpoint of improving the thermal conductivity.

Other electroconductive fillers can also be used in the electroconductive adhesive composition of the invention so long as the incorporation thereof does not lessen the effects of the invention. Such electroconductive fillers are not particularly limited so long as the fillers have electrical conductivity. Examples thereof include carbon nanotubes.

[Particles (B) of Thermoplastic Resin Which Is Solid at 25° C.]

The electroconductive adhesive composition of the present invention further contains particles (B) of a thermoplastic resin which is solid at 25° C. (hereinafter also referred to simply as "thermoplastic-resin particles (B)").

Usually, cured objects obtained from electroconductive adhesive compositions containing nanometer-order silver particles like the composition of the present invention (hereinafter, those cured objects are referred to also as "cured electroconductive adhesives") have a dense structure and hence low stress relaxation performance. Furthermore, upon repeated reception of temperature fluctuations, the cured electroconductive adhesives undergo metal growth, resulting in a further decrease in stress relaxation performance. Because of this, bonding with an electroconductive adhesive composition containing nanometer-order silver particles is prone to cause adherend separation due to the stress attributable to a difference in the coefficient of linear thermal expansion between the adherends.

In contrast, in the case of the electroconductive adhesive composition of the present invention, which contains the thermoplastic resin particles (B), the thermoplastic-resin particles (B) melt, when the composition is cured by heating, to fill the voids within the cured electroconductive adhesive. It is thought that the thermoplastic resin thus prevents the metals from moving in the cured electroconductive adhesive and that this prevents the adherends front becoming prone to be separated by the stress due to metal growth.

In addition, the thermoplastic resin which has filled the voids within the cured electroconductive adhesive can elastically deform to relax the stress, thereby improving the stress relaxation performance of the cured electroconductive adhesive. Furthermore, the thermoplastic resin fills the voids present at the bonding interface between the cured electroconductive adhesive and each adherend, thereby improving the adhesion strength. It is thought that these improvements contribute to inhibition of the separation due to repeated temperature fluctuations.

The thermoplastic-resin particles (B) in the present invention may be particles of a known resin. Examples thereof include particles of known polyamides, e.g., nylon-11, nylon-12, and nylon-6, AS resins, ABS resins, AES resins, vinyl acetate resins, polystyrene, polyethylene, polypropylene, poly(vinyl chloride), acrylic resins, methacrylic resins, poly(vinyl alcohol) resins, poly(vinyl ether)s, polyacetals, polycarbonates, poly(ethylene terephthalate), poly(butylene terephthalate), poly(vinyl butyral), polysulfones, polyetherimides, ethyl cellulose, cellulose acetate, various fluororesins, polyolefin elastomers, and saturated polyester resins. The particles (B) may be a mixture of two or more of these particulate materials.

Preferred of these, from the standpoint of improving the property of filling the voids within the cured electroconductive adhesive, are particles of resins having a melting point in the range of 50-300° C. More preferred are particles of resins having a melting point in the range of 80-250° C. Still more preferred are particles of resins having a melting point in the range of 100-225° C. Optimal are particles of resins having a melting point in the range of 100-220° C. Examples of the resins having a melting point in the range of 50-300° C. include nylon-12, nylon-11, nylon-6, polyethylene, polypropylene, vinyl acetate resins, and saturated polyester resins. Preferred of these are nylon-12, nylon-11, nylon-6, and polyethylene. More preferred are nylon-12, nylon-11, and nylon-6. Even more preferred are nylon-12 and nylon-11.

The average particle diameter of the thermoplastic-resin particles (B) in the present invention is preferably 30 μm or less, more preferably 20 μm or less, still more preferably 10 μm or less, from the standpoint of ensuring adhesion strength.

From the standpoint of ensuring the stress relaxation performance of the cured electroconductive adhesive, the average particle diameter of the thermoplastic-resin particles (B) in the present invention is preferably 1 μm or larger, more preferably 3 μm or larger, still more preferably 5 μm or larger.

The shape of the thermoplastic-resin particles (B) in the present invention is not particularly limited, and examples thereof include approximately-spherical, cubic, cylindrical, prismatic, conical, pyramidal, flaky, scaly, and dendritic shapes. Preferred are approximately spherical shapes and cubic shapes.

In the electroconductive adhesive composition of the present invention, the content of the thermoplastic-resin particles (B) is preferably 0.5% by mass or higher, more preferably 1% by mass or higher, still more preferably 2% by mass or higher, based on the whole electroconductive adhesive composition from the standpoint of highly preventing the adherends from separating off upon repeated reception of temperature fluctuations.

Meanwhile, from the standpoint of preventing the cured electroconductive adhesive from having a reduced thermal conductivity due to excessive inclusion of the thermoplastic-resin particles (B), the content thereof is preferably 10% by mass or less, more preferably 7% by mass or less, still more preferably 5% by mass or less.

[Other Ingredients]

<Binder Resin>

In the electroconductive adhesive composition of the present invention, the electroconductive filler (A) and the thermoplastic-resin particles (B) may have been dispersed in a binder resin. The binder resin is not particularly limited. For example, use can be made of an epoxy resin, a phenolic resin, a urethane resin, an acrylic resin, a silicone resin, a polyimide resin, or the like. One of these resins may be used alone, or two or more thereof may be used in combination. From the standpoint of operation efficiency, the binder resin in the present invention is preferably a thermosetting resin, especially preferably an epoxy resin.

The content of the binder resin is preferably 10% by mass or less, more preferably 8% by mass or less, still more preferably 6% by mass or less, based on the whole electroconductive adhesive composition. In cases when the content of the binder resin is 10% by mass or less, a network due to the necking of the electroconductive filler is apt to be formed and stable electrical conductivity and thermal conductivity are obtained. In the case of incorporating a binder resin, it is preferred to use the binder resin in an amount of 0.5% by mass or larger.

<Curing Agent>

The electroconductive adhesive composition of the present invention may contain, for example, a curing agent besides the ingredients described above. Examples of the curing agent include amine-based curing agents, such as tertiary amines, alkylureas, and imidazole, and phenolic curing agents.

The content of the curing agent is preferably 2% by mass or less based on the whole electroconductive adhesive composition. This is because the curing agent incorporated in such an amount is less apt to remain unreacted and brings about satisfactory adhesion to the adherends.

<Curing Accelerator>

A curing accelerator can be incorporated into the electroconductive adhesive composition of the present invention. Examples of the curing accelerator include imidazole compounds such as 2-phenyl-4,5-dihydroxymethylimidazole, 2-phenyl-4-methyl-5-hydroxymethylimidazole, 2-methyl-4-methylimidazole, and 1-cyano-2-ethyl-4-methylimidazole, tertiary amines, triphenylphosphine compounds, urea compounds, phenols, alcohols, and carboxylic acids. Only one curing accelerator may be used, or two or more curing accelerators may be used in combination.

The amount of the curing accelerator to be incorporated is not limited and may be suitably determined. However, in the case of using a curing accelerator, the amount thereof is generally 0.5% by mass or less based on the whole electroconductive adhesive composition of the present invention.

<Solvent>

The electroconductive adhesive composition of the present invention may further contain a solvent for making the electroconductive adhesive composition pasty. In the case where the composition contains a solvent, the solvent to be used is one in which the thermoplastic-resin particles (B) do not dissolve, from the standpoint of maintaining the shape of the thermoplastic-resin particles (B) in the paste. Although the solvent is not particularly limited in other respects, the solvent is preferably one having a boiling point of 350° C. or lower, more preferably one having a boiling point of 300° C. or lower, because this solvent is easy to volatilize in curing the electroconductive adhesive composition. Specific examples thereof include acetates, ethers, and hydrocarbons. More specifically, it is preferred to use dibutyl Carbitol, butyl Caritol acetate, or the like.

The content of the solvent, based on the electroconductive adhesive composition, is usually 15% by mass or less, and is preferably 10% by mass or less from the standpoint of operation efficiency.

Ingredients such as an antioxidant, ultraviolet absorber, tackifier, viscosity regulator, dispersant, coupling agent, toughening agent, and elastomer can be suitably incorporated, besides the ingredients described above, into the electroconductive adhesive composition of the present invention so long as the incorporation thereof does not lessen the effects of the invention.

The electroconductive adhesive composition of the present invention can be obtained by mixing and stirring the ingredients (A) and (B) described above and optional ingredients in any desired sequence. For dispersing the particulate ingredients, use can be made of a method employing, for example, a two-roll mill, three-roll mill, sand mill, roll mill, ball mill, colloid mill, jet mill, bead mill, kneader, homogenizer, propeller-less mixer, or the like.

The cured electroconductive adhesive of the present invention is obtained by curing the electroconductive adhesive composition of the invention. Methods for the curing are not particularly limited. For example, the cured electroconductive adhesive can be obtained by heat-treating the electroconductive adhesive composition at 150-300° C. for 0.5-3 hours.

The cured electroconductive adhesive of the present invention has a thermal conductivity of preferably 20 W/m·K or higher, more preferably 35 W/m·K or higher, still more preferably 50 W/m·K or higher, from the standpoint of ensuring the property of dissipating the heat generated by adherends. The thermal conductivity of the cured electroconductive adhesive can be calculated using the method which will be described later in Examples.

In bonding with the electroconductive adhesive composition of the present invention, the electroconductive adhesive composition is cured for bonding usually by heating. This heating is not particularly limited in temperature. However, from the standpoint of forming a close-contact state, in which the particles of the electroconductive filler (A) are in point contact with one another and the electroconductive filler (A) is in point contact with each adherend, and thereby forming a bonding part having a stabilized shape, the temperature to which the composition is heated is preferably 150° C. or higher, more preferably 180° C. or higher, still more preferably 200° C. or higher.

Meanwhile, from the standpoint of preventing the mutual bonding of the particles of the electroconductive filler (A) from proceeding excessively to bring the composition into an excessively hardened state in which the particles of the electroconductive filler (A) have been tenaciously bonded to one another due to necking, the temperature is preferably 300° C. or lower, more preferably 275° C. or lower, still more preferably 250° C. or lower.

There are various methods for evaluating adherends bonded with the electroconductive adhesive composition of the present invention, for the property of being less apt to separate off even upon repeated reception of temperature fluctuations. Examples thereof include a method in which a thermal cycle test is conducted in the manner that will be shown later in Examples and the areal proportion of separated portions after the test is determined in the manner that will be shown later in Examples. The areal proportion of separated portions determined by this method is preferably 15% or less, more preferably 10% or less, still more preferably 5% or less.

The electroconductive adhesive composition of the present invention can be used for bonding components in producing electronic appliances.

EXAMPLES

The present invention is explained below in more detail by reference to Examples, but the invention is not construed as being limited by the following Examples in any way.

A. Preparation of Electroconductive Adhesive Compositions

The materials shown in Table 1 were kneaded with a three-roll mill to prepare electroconductive adhesive compositions having the makeups shown in Table 1 (the numerals for each material indicate amounts in % by mass based on the whole mass of the respective electroconductive adhesive compositions). The materials used are as follows. The sequence of kneading was: metal particles (a1), silver particles (a2), thermoplastic-resin particles (B), binder resin curing agent, curing accelerator, and solvent.

[Electroconductive Filler (A)]
<Metal Particles (a1)>
Silver particles (1): flaky; average particle diameter d50, 5.5 μm; tap density, 7.0 g/cm$^3$; manufactured by Tanaka Kikinzoku Kogyo K.K.
Silver particles (2): flaky; average particle diameter d50, 4 μm; tap density, 6.7 g/cm$^3$; manufactured by Tanaka Kikinzoku Kogyo K.K.
Silver particles (3): spherical; average particle diameter d50, 0.8 μm, tap density, 5.5 g/cm$^3$; manufactured by Tanaka Kikinzoku Kogyo K.K.
Copper particles: spherical; average particle diameter d50, 5 μm; tap density, 5.0 g/cm$^3$; manufactured by Mitsui Mining & Smelting Co., Ltd.
<Silver Particles (a2)>
Silver particles (4): spherical; average particle diameter d50, 0.09 μm; manufactured by Tanaka Kikinzoku Kogyo K.K.

[Thermoplastic-Resin Particles (B)]
Thermoplastic-resin particles (1): "SP-500" (trade name), manufactured by Toray Inc.; made of nylon-12; average particle diameter d50, 5 μm; spherical; melting point, 165-171° C.
Thermoplastic-resin particles (2): "SP-10" (trade name), manufactured by Toray Inc.; made of nylon-12; average particle diameter d50, 10 μm; spherical; melting point, 165-171° C.
Thermoplastic-resin particles (3): "PM-200" (trade name), manufactured by Mitsui Chemicals Inc.; made of polyethylene average particle diameter d50, 10 μm; spherical; melting point, 136° C.

[Binder Resins, Curing Agent, Curing Accelerator, Solvents]
Epoxy resin (1): "EPICLON 830-S" (trade name), manufactured by Dainippon ink Chemicals, Inc.; liquid at room temperature; epoxy equivalent, 169 g/eq
Epoxy resin (2): "ERISYS GE-21" (trade name), manufactured by CVC; liquid at room temperature; epoxy equivalent, 125 g/eq
Curing agent: phenolic curing agent (MEH8000H, manufactured by Meiwa Plastic Industries, Ltd.)
Curing accelerator: 2-phenyl-4,5-dihydroxymethylimidazole (2PHZ, manufactured by Shikoku Chemicals Corp.)
Solvent (1): dibutyl Carbitol (manufactured by Tokyo Kasei Kogyo Co., Ltd.)
Solvent (2): butyl Carbitol acetate (manufactured by Tokyo Kasei Kogyo Co., Ltd.)

B. Property Evaluation

Each electroconductive adhesive composition obtained was applied to a silver-plated copper lead frame having a size of 10 mm×10 mm, and a silicon chip coated with silver by sputtering and having a size of 5 mm×5 mm was placed on the applied composition. Thereafter, this assemblage was heated at 250° C. for 60 minutes in a nitrogen atmosphere, thereby producing a metallic bonded object in which the silver-plated copper lead frame and the silicon chip coated with silver by sputtering had been bonded to each other with a cured electroconductive adhesive (hereinafter also referred to simply as "metallic bonded object").

The thermal conductivity of each of the metallic bonded objects is shown in Table 1.

The thermal conductivity λ (W/m·K) was determined by determining the thermal diffusivity [a] using a laser-flash-method thermal constant measurement system ("TC-7000" (trade name), manufactured by ULVAC-RIKO, Inc.) in accordance with ASTM-E1461, calculating the room-temperature specific gravity [d] by the pycnometer method, determining the room-temperature specific heat [Cp] using a differential scanning calorimeter ("DSC7020" (trade name), manufactured by Seiko Instruments & Electronics Ltd.) in accordance with JIS-K7123:2012, and calculating the thermal conductivity using the expression λ=a×d×Cp.

Furthermore, each metallic bonded object obtained was subjected to a thermal cycle test to determine the area of separated portions. In this test, the metallic bonded object was held at −50° C. for 30 minutes and then held at 150° C. for 30 minutes, and this operation as one cycle was repeated to conduct 2,000 cycles in total. After the test, the areal proportion of separated portions of the silicon chip was determined. The results are shown in Table 1.

The areal proportion of the separated portions was determined by obtaining an image of the separated state of the metallic bonded object which had undergone the 2,000 cycles, using ultrasonic imaging/inspection device "Fine SAT" (trade name), converting the image having various color densities into a two-gradation image composed of white pixels and black pixels using binarization software "image J", and determining the areal proportion using the following expression.

Areal proportion of separated portions (%)=[area of separated portions (number of black pixels)]/ [area of the chip (number of black pixels+number of white pixels)]×100

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Electroconductive filler (A) | Metal particles (a1) Silver particles (1) | — | — | — | — | — | — | — | 26.55 |
|  | Silver particles (2) | 63.64 | 62.78 | 61.95 | 60.34 | 61.95 | 62.50 | 44.25 | — |
|  | Silver particles (3) | — | — | — | — | — | — | — | 35.40 |
|  | Copper particles | — | — | — | — | — | — | — | — |
| Silver particles (a2) | Silver particles (4) | 27.27 | 26.91 | 26.55 | 25.86 | 26.55 | 26.79 | 44.25 | 26.55 |
| Thermoplastic-resin particles (B) | Thermoplastic-resin particles (1) | 0.91 | 1.79 | 2.65 | 4.31 | — | — | 2.65 | 2.65 |
|  | Thermoplastic-resin particles (2) | — | — | — | — | 2.65 | — | — | — |
|  | Thermoplastic-resin particles (3) | — | — | — | — | — | 2.68 | — | — |
| Binder resin | Epoxy resin (1) | 0.91 | 0.90 | 0.88 | 0.86 | 0.88 | 0.89 | 0.88 | 0.88 |
|  | Epoxy resin (2) | 0.45 | 0.45 | 0.44 | 0.43 | 0.44 | 0.45 | 0.44 | 0.44 |
| Curing agent | Curing agent | 0.36 | 0.36 | 0.35 | 0.34 | 0.35 | 0.36 | 0.35 | 0.35 |
| Curing accelerator | Curing accelerator | 0.09 | 0.09 | 0.09 | 0.09 | 0.09 | 0.09 | 0.09 | 0.09 |
| Solvent | Solvent (1) | — | — | — | — | — | 6.25 | — | — |
|  | Solvent (2) | 6.36 | 6.73 | 7.08 | 7.76 | 7.08 | — | 7.08 | 7.08 |
| Thermal conductivity (W · mK) |  | 150 | 140 | 125 | 80 | 130 | 90 | 155 | 140 |
| Area of separated portions (%) |  | 9 | 7 | 2 | 3 | 6 | 12 | 8 | 2 |

|  |  | Ex. 9 | Ex. 10 | Ex. 11 | Ex. 12 | Ex. 13 | Ex. 14 | Comp. Ex. 1 |
|---|---|---|---|---|---|---|---|---|
| Electroconductive filler (A) | Metal particles (a1) Silver particles (1) | 29.13 | 21.51 | 26.79 | 26.79 | 27.03 | — | — |
|  | Silver particles (2) | — | — | — | — | — | — | 63.64 |
|  | Silver particles (3) | 38.83 | 53.76 | 35.71 | 35.71 | 36.04 | 35.40 | — |
|  | Copper particles | — | — | — | — | — | 26.55 | — |
| Silver particles (a2) | Silver particles (4) | 19.42 | 10.75 | 26.79 | 26.79 | 27.03 | 26.55 | 27.27 |
| Thermoplastic-resin particles (B) | Thermoplastic-resin particles (1) | 2.91 | 3.23 | 2.68 | 2.68 | 0.45 | 2.65 | — |
|  | Thermoplastic-resin particles (2) | — | — | — | — | — | — | — |
|  | Thermoplastic-resin particles (3) | — | — | — | — | — | — | — |
| Binder resin | Epoxy resin (1) | 0.97 | 1.08 | 0.45 | — | 1.80 | 0.88 | 0.91 |
|  | Epoxy resin (2) | 0.49 | 0.54 | 7.37 | — | 0.90 | 0.44 | 0.45 |
| Curing agent | Curing agent | 0.39 | 0.43 | 0.18 | — | 0.72 | 0.35 | 0.36 |
| Curing accelerator | Curing accelerator | 0.10 | 0.11 | 0.04 | — | 0.18 | 0.09 | 0.09 |
| Solvent | Solvent (1) | — | — | — | — | — | — | — |
|  | Solvent (2) | 7.77 | 8.60 | — | 8.04 | 5.86 | 7.08 | 7.27 |
| Thermal conductivity (W · mK) |  | 125 | 110 | 150 | 200 | 130 | 100 | 180 |
| Area of separated portions (%) |  | 6 | 8 | 6 | 3 | 10 | 12 | 92 |

As Table 1 shows, the metallic bonded objects obtained in the Examples had smaller areas of portions separated through the thermal cycle test than the metallic bonded object obtained in the Comparative Example, and had satisfactory values of thermal conductivity.

It was ascertained from these results that the electroconductive adhesive compositions of the present invention were able to attain bonding which as excellent in of thermal conductivity and was less apt to cause adherend separation even upon repeated reception of temperature fluctuations.

While the invention has been described in detail and with reference to specific embodiments thereof, it will be apparent to one skilled in the art that various changes and modifications can be made therein without departing from the spirit and scope thereof. This application is based on a Japanese patent application filed on Jul. 11, 2017 (Application No. 2017-135202), the entire contents thereof being incorporated herein by reference. All the references cited herein are incorporated as a whole.

The invention claimed is:

1. An electroconductive adhesive composition which comprises:
    an electroconductive filler (A) comprising metal particles (a1) having an average particle diameter of 0.5-10 μm and silver particles (a2) having an average particle diameter of 10-200 nm; and
    particles (B) of a thermoplastic resin which is solid at 25° C. the thermoplastic resin comprising nylon-12, nylon-11, nylon-6, or a mixture thereof,
    wherein the metal particles (a1) and the silver particles (a2) are contained in a proportion in the range of 95:5 to 62.5:26.79 in terms of mass ratio,
    the thermoplastic-resin particles (B) are contained in an amount in the range of 5% by mass or less based on the whole electroconductive adhesive composition, and
    the metal particles (a1) and the silver particles (a2) have a tap density of 4 to 8 g/cm$^3$.

2. The electroconductive adhesive composition according to claim 1, wherein the metal particles (a1) includes silver as a main component.

3. The electroconductive adhesive composition according to claim 1, wherein the metal particles (a1) and the silver particles (a2) are contained in amounts in the ranges of 35-85% by mass and 5-50% by mass, respectively, based on the whole electroconductive adhesive composition.

4. The electroconductive adhesive composition according to claim 1, wherein the thermoplastic resin has a melting point in the range of 50-300° C.

5. The electroconductive adhesive composition according to claim 1, wherein the thermoplastic-resin particles (B) have an average particle diameter of 1-30 μm.

6. The electroconductive adhesive composition according to claim 1, wherein the thermoplastic-resin particles (B) are contained in an amount in the range of 0.1-5% by mass based on the whole electroconductive adhesive composition.

7. A cured electroconductive adhesive obtained by curing the electroconductive adhesive composition according to claim 1.

8. An electronic appliance in which the electroconductive adhesive composition according to claim 1 has been used for bonding a component.

* * * * *